United States Patent Office 2,995,774
Patented Aug. 15, 1961

2,995,774
MIXING AND KNEADING MACHINE FOR THICK MASSES
Carlo Pasquetti, 103 Via Sanvito Silvestro, Varese, Italy
Filed Dec. 8, 1959, Ser. No. 858,269
2 Claims. (Cl. 18—2)

This invention relates to a mixing and kneading machine for thick masses, such as rubber, thermoplastic materials and the like.

Mixing and kneading machines are known which comprise gears mounted on parallel shafts for intermeshing, the mass being compressed by the gears, mixed and kneaded and returned in a closed cycle to the top of the chambers enclosing the gears.

It has been found that this construction requires a high power for operation of the machine, which necessitates a high-powered driving motor and entails a highly expensive installation and operation.

With a view to avoiding the above drawbacks the invention provides a mixing and kneading machine in which the intermeshing gears mounted on parallel shafts each comprise a helical set of teeth composed of two oppositely inclined sections, an annular groove being formed between the sections of the helical teeth sets in each gear for circulation of the mass between the gears. This gear construction considerably reduces the power required for operating the machine, hence the cost of installation and operation. Moreover, the mass is subjected by the machine to efficient mixing and kneading, the small clearances between the teeth mixing the mass under conditions narrowly approaching a rolling action.

The invention moreover provides a piston feeding the mass to be mixed and kneaded under pressure in a compressed condition to the gears, which thorough penetration of the mass between the gears is insured.

Figure 1:
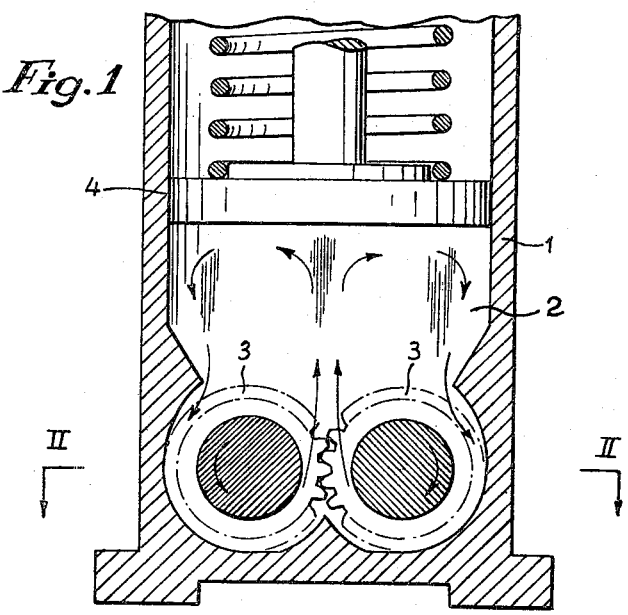
Figure 2:
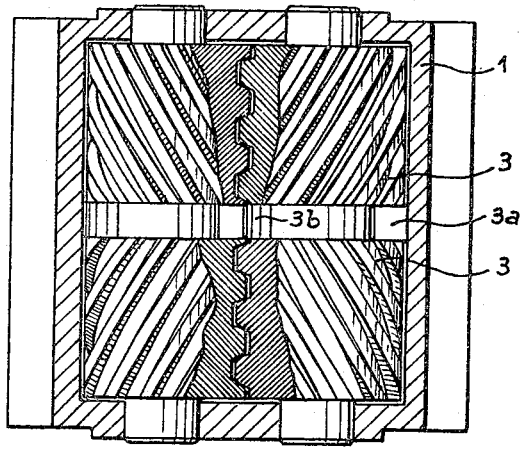

An embodiment of the invention shall now be described with reference to the accompanying drawing, wherein:

FIGURE 1 is a vertical sectional view of the machine, and
FIGURE 2 is a horizontal sectional view on line II—II of FIGURE 1.

The casing 1 of the machine defines an inner chamber 2 filled with the mass to be mixed and kneaded, such as rubber, plastic material and the like. This material is suitably-compressed by a pressure piston 4 arranged at the top of the chamber 2.

A pair of bihelically-toothed spur gears 3 are arranged in the bottom portion of the chamber, said gears intermeshing in sliding contact with the side and bottom walls of the chamber 2.

The bihelically-toothed gears are formed with a middle groove 3a to provide at the axis of the chamber 2 a conduit 3b for circulation of the mass. The teeth in each bihelical gear 3 are arranged to form a substantially V-shaped structure, the apex of which is situated at the middle groove 3a.

The machine operates as follows: the material in the chamber 2 is circulated through rotation of the gears 3 in the direction denoted by the arrows. The material fills the clearances between the sets of teeth and undergoes as it is downwardly conveyed in contact with the side walls of the chamber an axial displacement by effect of the inclination of the sets of teeth, thereby reaching the middle conduit 3b which conveys it upwardly to the top of the chamber. The mass is thereby effectively mixed and kneaded to the required homogeneity.

What I claim is:

1. Mixing and kneading machine for thick masses, such as rubber, thermoplastic and the like material, comprising; a casing having side and bottom walls defining a chamber with upper and lower portions for receiving said material; elongated bihelically-toothed spur gears mounted for rotation in the lower portion of said chamber, said gears intermeshing and in sliding contact with said side and bottom walls of said casing, the bihelical teeth of each said spur gear being of equal length and oppositely inclined to form substantially open V-shaped teeth with apexes intermediate the spur gear ends; a circumferential middle groove defined in each said spur gear between said bihelical teeth at said apexes to form a center conduit between the upper and lower portions of said chamber for the circulation of said material therebetween; and piston means for pressing said material in the upper portion of said chamber into contact with said spur gears in the lower portion; whereby when one of said gears is rotated said material is continuously circulated, mixed and kneaded between the bihelical teeth of said spur gears and the side and bottom walls of said casing.

2. A mixing and kneading machine as described in claim 1 characterized in that said piston means comprises a piston adapted to fit into the top of said casing, and biasing means for biasing said piston to press against the material in the upper portion of said chamber for feeding the material to be mixed and kneaded under pressure to said spur gears.

References Cited in the file of this patent

UNITED STATES PATENTS

| | | |
|---|---|---|
| 1,200,070 | Banbury | Oct. 3, 1916 |
| 1,424,445 | Bowen et al. | Aug. 1, 1922 |
| 1,427,271 | Eger | Aug. 29, 1922 |
| 2,170,303 | Helstrup | Aug. 22, 1939 |
| 2,415,091 | Frei | Feb. 4, 1947 |